Figure 1:
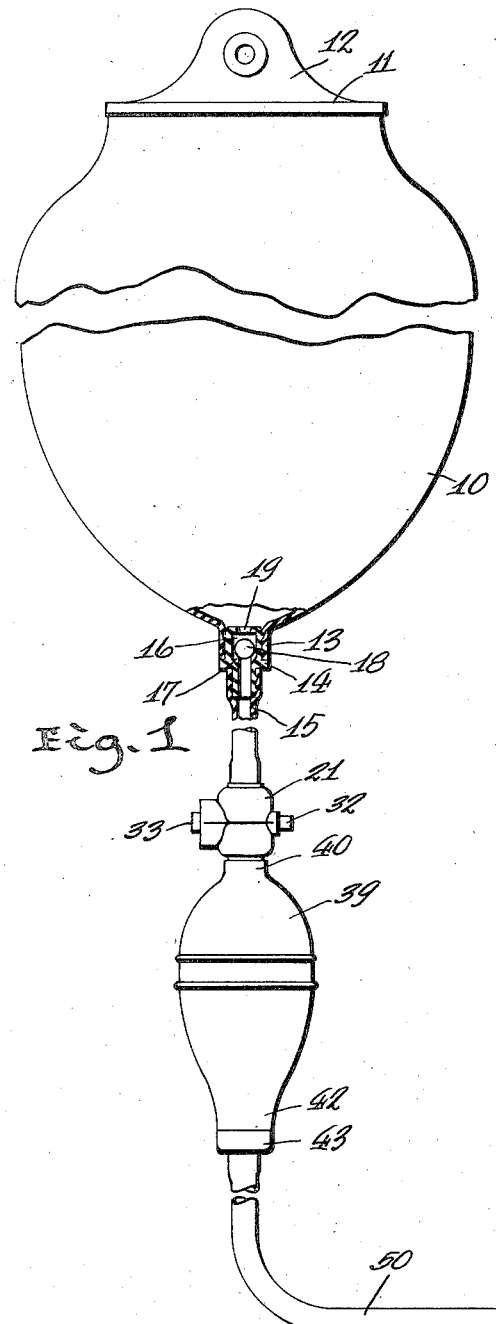

June 23, 1936.  T. W. MILLER  2,044,911

FOUNTAIN SYRINGE

Filed July 1, 1932

Thomas W. Miller
INVENTOR

By Freeman and Weidman
ATTORNEYS

Patented June 23, 1936

2,044,911

UNITED STATES PATENT OFFICE 2,044,911

FOUNTAIN SYRINGE

Thomas W. Miller, Ashland, Ohio, assignor to
The Faultless Rubber Company, Ashland, Ohio,
a corporation of Ohio Application July 1, 1932, Serial No. 620,416

12 Claims. (Cl. 128—227)

This invention relates to fountain syringes, and has for an object the provision of a new and improved article of this character.

Figure 2:
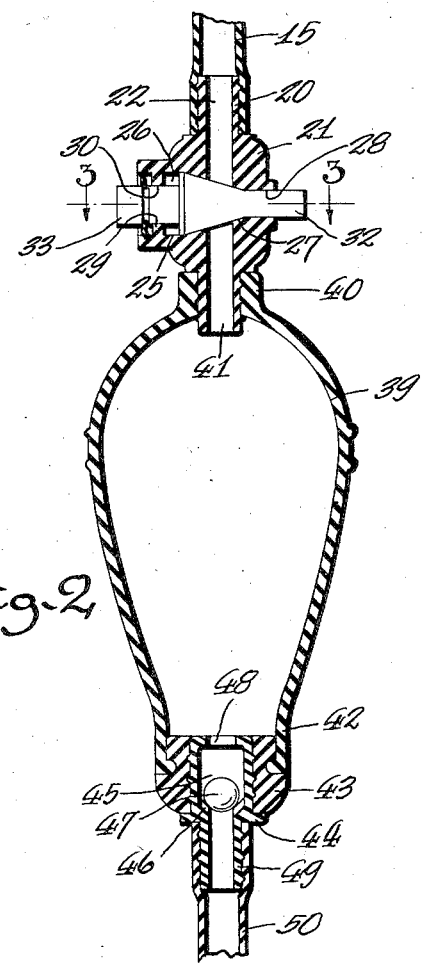
Figure 3:
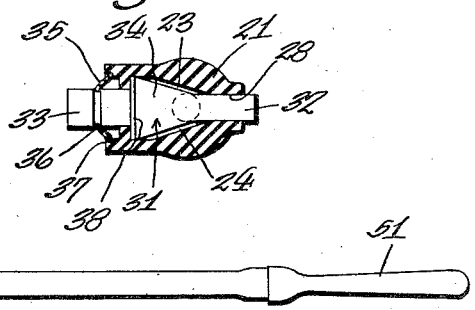

In the drawing accompanying this specification and forming a part of this application, I have shown, for purposes of illustration, one embodiment which my invention may assume, and in the drawing:

Figure 1 is a broken elevational view, partly in section, of the embodiment of my invention herein disclosed, Figure 2 is an enlarged fragmentary sectional view of the valve construction shown in Figure 1, while Figure 3 is a horizontal sectional view, corresponding substantially to line 3—3 of Figure 2, but showing the valve in open position.

The embodiment herein disclosed comprises a flexible rubber bag 10 having a filling opening 11 at its upper end, having a perforated ear portion 12, by means of which the device may be suspended, and is provided adjacent its lower end with a restricted portion 13 embracing and cemented to one end of a sleeve 14 of relatively stiff rubber, the lower reduced end of which projects into the upper end of a flexible rubber tube 15.

The sleeve 14 contains an enlarged valve chamber 16 having at its lower end an annular corrugated surface 17 upon which a ball valve 18 is adapted to rest but which permits fluid to pass thereby from the receptacle 10 to the tube 15. At the upper end of the chamber 16 is a valve seat 19 upon which the ball valve 18 is adapted to seat, to prevent back-flow of fluid from the tube 15 into the receptacle 10. The lower end of the tube 15 frictionally embraces the tubular end 20 of a valve body 21 and communicates with one end of a passage 22 extending longitudinally through the valve body 21.

The valve body 21 is of relatively hard rubber, to prevent undue deformation under pressure and be substantially self-supporting. The bore 22 is transversely intersected by the central portion 23 of a bore 24 extending through the body 21. The central portion 23 of the bore 24 is of conical configuration, and the larger end 25 thereof merges into a cylindrical chamber 26 of substantially the same cross-section as the large end 25, while the reduced end 27 of the conical portion 23 merges into a cylindrical bore 28 of substantially the same cross-section as the reduced end 27. The outer end of the chamber 26 is partially closed by an integral inwardly extending annular collar 29 provided with a central aperture 30. Reciprocally mounted in the bore 24 is a valve 31, of relatively hard rubber, having valve stems 32 and 33 reciprocally mounted respectively in the bore 28 and aperture 30, and comprising intermediate these stems 32 and 33 a conical portion 34 adapted to seat in the conical bore 23. The chamber 26 is completely sealed against leakage by inserting a flexible rubber washer 35 between an annular groove 36 in the valve stem 33 and an annular groove 37 in the valve body 21 beyond the annular collar 29.

Pressure on the valve stem 32 moves the valve 31 in the bore 24 to unseat the conical portion 34 of the valve 31 from the central portion 23 of the bore 24, thus to open the passage 22, to establish communication with the receptacle 10, while pressure on the opposite valve stem 33 reverses the original movement of the valve 31 and closes the passage 22 to cut off communication with the receptacle 10. The opening movement of the valve 31 is limited by engagement with the collar 29 and a shoulder 38 present between the valve stem 33 and the large end of the conical section 34, while the closing movement of the valve 31 is limited by the seating of the conical section 34 in the conical central section 23 of the bore 24.

The passage 22 communicates at its other end with the upper end of a collapsible rubber bulb 39 having a restricted portion 40 which frictionally embraces the tubular end 41 of the valve body 21, and having at its other end a neck portion 42 which frictionally embraces a relatively soft rubber sleeve 43 frictionally embracing a relatively hard rubber sleeve 44.

The hard rubber sleeve 44 contains an enlarged valve chamber 45 having at its lower end an annular corrugated surface 46 upon which a ball valve 47 is adapted to rest, but which permits fluid to pass from the receptacle 10 and the bulb 39, while at its upper end the chamber 45 carries a valve seat 48 upon which the ball valve 47 is adapted to seat, to prevent back-flow of fluid into the bulb 39. The lower end 49 of the sleeve 44 is frictionally embraced by the upper end of a flexible rubber tube 50, the lower end of which detachably embraces a suitable discharge nozzle 51.

When the valve 31 is opened, communication is established with the receptacle 10, and the fluid will flow from the nozzle 51 in a continuous stream, by gravity, and with a force determined by the hydrostatic head of the fluid, and continuance of flow of fluid is stopped by moving the valve 31 to closed position.

When used in this manner my invention fulfills all the requirements of a syringe.

However, if it is desired that the fluid during its flow be ejected with greater force, the bulb 39 is compressed, thereby exerting additional pressure on the fluid in the tube 50, below the valve chamber 45, causing the fluid to emerge from the nozzle 51 in the required jet or spray.

As soon as the pressure on the bulb 39 is removed, the fluid from the bag 10 will flow into the bulb 39, to refill the bulb, and the fluid will emerge from the nozzle 51 in a continuous stream, as before, unless and until the bulb 39 is again collapsed, to repeat the force ejection.

When used in this manner my invention aptly serves as a douche.

The back-flow of fluid through the valve mechanism is prevented by means of the ball valve 47. This valve is normally open, resting on the annular corrugated surface 46 permitting fluid to pass, but rises to close the passage immediately any fluid begins to back-flow when the bulb 39 is released from collapsed position. Similarly, back-flow of fluid into the receptacle 10 is prevented by means of the ball valve 18. This valve is normally open, resting on the annular corrugated surface 17, permitting fluid to pass, but rises to close the passage immediately the bulb 39 is compressed and pressure is applied.

From the foregoing it will be obvious that my device is applicable for use not only as a syringe but also as a douche, by providing a valve mechanism to control the flow of fluid, and by providing a collapsible bulb by which the fluid may be ejected in jets or sprays from the nozzle 51.

Under these circumstances it will be apparent to those skilled in the art that the embodiment herein disclosed accomplishes at least the principal object of the invention, but also, that the construction is adaptable to a wide variety of uses, and embodies advantages other than those herein discussed, and also, that the particular embodiment may be variously changed and modified without departing from the spirit or scope of the invention, and accordingly it will be understood that the above disclosure is illustrative only, and that my invention is not limited thereto.

I claim:

1. In a device of the character described, a valve casing having a conduit, and having a bore intersecting said conduit, valve mechanism disposed in said bore, shiftable in one direction to open passage through said conduit, and shiftable in an opposite direction to close passage through said conduit, and movable sealing means disposed between said valve mechanism and said casing, movable with said valve mechanism, to prevent leakage from said bore regardless of the position of said valve mechanism.

2. In a device of the character described, a valve casing having a conduit, and having a bore intersecting said conduit, valve mechanism disposed in said bore, shiftable in one direction to open passage through said conduit, and shiftable in an opposite direction to close passage through said conduit, and movable sealing means secured to said valve mechanism and said casing, movable with said valve mechanism, to prevent leakage from said bore.

3. A fountain syringe, comprising: a receptacle, for containing a fluid; a conduit, leading from said receptacle to a point of discharge; transversely reciprocable valve means, cooperable with said conduit for controlling the flow of fluid through said conduit; and force means, for increasing the velocity of the fluid flowing through said conduit; said valve means and said force means being disposed in adjacent relation so that one hand of a user may reciprocate said valve means transversely without removal of said hand from operative relation with said force means.

4. A device of the character described, comprising: a valve body, having a fluid conduit extending therethrough, and having a valve bore intersecting said conduit and traversing said body; and a shiftable valve member, disposed within said bore, and having operative portions extending outwardly from the ends of said bore, and on opposite sides of said body, so that said member may be shifted in one direction by operation on one of said portions to establish communication through said conduit, and in the other direction by operation on the other of said portions to interrupt communication through said conduit.

5. A device of the character described, comprising: a valve body, having a fluid conduit extending therethrough, and having a valve bore intersecting said conduit and traversing said body; and a shiftable valve member, disposed within said bore, and having operative portions extending outwardly from the ends of said bore, and on opposite sides of said body, so that said member may be shifted in one direction by operation on one of said portions to establish communication through said conduit, and in the other direction by operation on the other of said portions to interrupt communication through said conduit, and said valve mechanism being so constructed to remain in any one of its operative positions after operation on a respective portion has ceased.

6. A device of the character described, comprising: a valve body, having a fluid conduit extending therethrough, and having a valve bore intersecting said conduit and traversing said body; a shiftable valve member, disposed within said bore, and having operative portions extending outwardly from the ends of said bore, and on opposite sides of said body, so that said member may be shifted in one direction by operation on one of said portions to establish communication through said conduit, and in the other direction by operation on the other of said portions to interrupt communication through said conduit; and force means communicating with said valve body and operable to increase the velocity of fluid flow through said conduit, said force means being disposed adjacent said operative portions so that one hand of a user may operate said valve member without removal from said force means.

7. A device of the character described, comprising: a valve body, having a fluid conduit extending therethrough, and having a valve bore intersecting said conduit and traversing said body; a shiftable valve member, disposed within said bore, and having operative portions extending outwardly from the ends of said bore, and on opposite sides of said body, so that said member may be shifted in one direction by operation on one of said portions to establish communication through said conduit, and in the other direction by operation on the other of said portions to interrupt communication through said conduit, and said valve mechanism being so constructed to remain in any one of its operative positions after operation on a respective operative portion has ceased; and force means disposed adjacent said operative portions so that one hand of a user may operate said valve member without removal from said force means.

8. A fountain syringe, comprising: a conduit, adapted to lead from the receptacle of said fountain syringe to a point of discharge; a valve body interposed in said conduit, and having a passage establishing communication through said conduit; said valve body also having a bore intersecting said conduit and traversing said body; a shiftable valve member, disposed within said bore, and having operative portions extending outwardly from the ends of said body, and on opposite sides thereof, so that said valve member may be shifted in one direction by operation on one of said portions to establish communication through said conduit, and in the other direction by operation on the other of said portions to interrupt communication through said conduit; and force means axially aligned with said conduit means, for increasing the velocity of the fluid flowing through said conduit, and being disposed adjacent said operative portions so that one hand of a user may operate said valve means without removal from said force means.

9. A fountain syringe, comprising: a receptacle, for containing fluid; valve means having a conduit, and having a bore intersecting said conduit, and valve mechanism disposed in said bore and having operative portions at opposite sides of said conduit, whereby said valve mechanism is manipulable by opposed fingers of the one hand of a user alternately pressing against each of said operative portions to thereby control the flow of fluid through said conduit, said valve mechanism having valve elements engageable to prevent leakage from said bore regardless of the position of said valve mechanism.

10. A device of the characer described, comprising: a valve body, having a fluid conduit extending therethrough, and having a valve bore intersecting said conduit and traversing said body; and a valve member, disposed within said bore, shiftable longitudinally of said bore to establish or interrupt communication through said conduit, and having operative portions extending outwardly from the ends of said bore, on opposite sides of said body, whereby said member may be shifted in one direction by operation on one of said portions and in the other direction by operation on the other of said portions; and sealing means disposed adjacent the ends of said bore, and engageable with said valve member when the same is in communication-establishing position to seal said bore.

11. A device of the character described, comprising: a valve body, having a fluid conduit extending therethrough, and having a valve bore intersecting said conduit and traversing said body, said bore including a conical valve seat and a cylindrical guiding surface; and a conical longitudinally shiftable valve member, disposed within said bore, and provided with a cylindrical guiding portion cooperable with said guiding surface to guide the movement of said valve member, said valve member also having operative portions extending outwardly from the ends of said bore, on opposite sides of said body, whereby said member may be shifted in one direction by operation on one of said portions to establish communication through said conduit, and in the other direction by operation on the other of said portions to interrupt said communication.

12. A fountain syringe, comprising: a receptacle for containing the fluid; a valve body, having a fluid conduit extending therethrough and communicating with said receptacle, said valve body also having a valve bore traversing the same and intersecting said conduit; and a valve member, disposed within said bore, shiftable longitudinally of said bore to establish or interrupt communication through said conduit, and having operative portions extending outwardly from the ends of said bore, on opposite sides of said body, whereby said member may be shifted in one direction by operation on one of said portions and in the other direction by operation on the other of said portions; and force means operable to increase the flow of fluid through said conduit, and disposed adjacent said operative portions, whereby one hand of a user may manipulate said operative portions without removal from said force means.

THOMAS W. MILLER.